United States Patent
Dusenberry et al.

(10) Patent No.: US 11,109,313 B2
(45) Date of Patent: Aug. 31, 2021

(54) CELLULAR MODEM FOR LOW POWER APPLICATIONS

(71) Applicant: Itron, Inc., Liberty Lake, WA (US)

(72) Inventors: Robert Vernon Dusenberry, Liberty Lake, WA (US); Aaron Fitzgerald, Liberty Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 16/938,794

(22) Filed: Jul. 24, 2020

(65) Prior Publication Data
US 2020/0359315 A1 Nov. 12, 2020

Related U.S. Application Data

(62) Division of application No. 16/237,214, filed on Dec. 31, 2018, now Pat. No. 10,728,847.
(Continued)

(51) Int. Cl.
*H04W 52/02* (2009.01)
*G08B 21/18* (2006.01)
(Continued)

(52) U.S. Cl.
CPC ...... *H04W 52/0216* (2013.01); *G08B 21/182* (2013.01); *H04Q 9/02* (2013.01);
(Continued)

(58) Field of Classification Search
CPC ............. H04W 52/0216; H04W 24/08; H04W 52/0296; H04W 52/0274; H04W 52/0261;
(Continued)

(56) References Cited

U.S. PATENT DOCUMENTS 6,678,538 B1 * 1/2004 Koizumi .......... H04W 52/0277
455/574
9,929,772 B2 3/2018 Rose et al.
(Continued)

FOREIGN PATENT DOCUMENTS

EP 2996406 A1 3/2016
EP 2973933 B1 10/2017
(Continued)

OTHER PUBLICATIONS

The Invitation to Pay Additional Fees dated Dec. 10, 2019 for PCT Application No. PCT/US2019/054861, "Battery Power Management for a Cellular Device", 11 pages.
(Continued)

*Primary Examiner* — Munear T Akki
(74) *Attorney, Agent, or Firm* — Lee & Hayes, P.C.

(57) ABSTRACT

A cellular modem is configured for low power applications. In some instances, the cellular modem includes a transceiver, a processor to control the transceiver, a memory device in communication with the processor, and a general-purpose input/output (GPIO) pin, controlled by the processor. In an example, the cellular modem receives an appointed time for an upcoming communication and determines a time to activate a power supply. The determination may be based at least in part on the appointed time for the communication, so that the power supply is ready to supply power at a level consistent with use of the transceiver at the appointed time of the communication. At the determined time, a signal from the GPIO pin is used to activate the power supply, resulting in an increase in power supplied to the cellular modem in a just-in-time manner.

19 Claims, 8 Drawing Sheets

Related U.S. Application Data

(60) Provisional application No. 62/742,194, filed on Oct. 5, 2018.

(51) Int. Cl.
*H04W 24/08* (2009.01)
*H04Q 9/02* (2006.01)

(52) U.S. Cl.
CPC ....... *H04W 24/08* (2013.01); *H04W 52/0296* (2013.01); *H04Q 2209/88* (2013.01)

(58) Field of Classification Search
CPC .......... H04W 52/0248; H04W 52/0258; G08B 21/182; H04Q 9/02; H04Q 2209/88; H04Q 2209/60; H04Q 2209/40; H04Q 9/00; Y02D 10/00; Y02D 30/70; G06F 1/3206; G06F 1/3278; G06F 1/3296
See application file for complete search history.

(56) References Cited

U.S. PATENT DOCUMENTS

| | | | |
|---|---|---|---|
| 10,085,275 B2 | 9/2018 | Elsayed et al. | |
| 2009/0149127 A1* | 6/2009 | Viitamaki | H04M 1/725 455/41.2 |
| 2010/0026517 A1 | 2/2010 | Cumeralto et al. | |
| 2013/0182625 A1* | 7/2013 | Kuehnel | H04W 76/10 370/311 |
| 2013/0331081 A1* | 12/2013 | Rune | H04W 52/0229 455/418 |
| 2014/0024416 A1* | 1/2014 | Xie | H04W 52/0261 455/574 |
| 2016/0260059 A1 | 9/2016 | Benjamin et al. | |
| 2017/0061920 A1* | 3/2017 | Dey | G09G 5/001 |
| 2017/0093540 A1 | 3/2017 | Lei et al. | |
| 2017/0135052 A1 | 5/2017 | Lei et al. | |
| 2018/0084505 A1* | 3/2018 | Guillen | H04W 52/028 |
| 2018/0124544 A1 | 5/2018 | Gupta et al. | |
| 2018/0139697 A1* | 5/2018 | Kim | H04W 76/28 |
| 2018/0152889 A1 | 5/2018 | Kim et al. | |
| 2018/0295583 A1 | 10/2018 | Cornwall et al. | |
| 2018/0321356 A1 | 11/2018 | Kulkarni et al. | |
| 2019/0342722 A1 | 11/2019 | Lee et al. | |
| 2019/0364508 A1 | 11/2019 | Cornwall et al. | |
| 2020/0100088 A1 | 3/2020 | Kim et al. | |
| 2020/0107237 A1 | 4/2020 | Mangalvedhe et al. | |
| 2020/0112915 A1 | 4/2020 | Dusenberry et al. | |
| 2020/0112916 A1 | 4/2020 | Dusenberry | |
| 2020/0120478 A1 | 4/2020 | Kim | |
| 2020/0267670 A1 | 8/2020 | Åström et al. | |

FOREIGN PATENT DOCUMENTS

| | | |
|---|---|---|
| GB | 2549793 A | 11/2017 |
| WO | WO2008086231 | 7/2008 |
| WO | WO2012142657 | 10/2012 |
| WO | WO2016122394 | 8/2016 |
| WO | WO2016140969 | 9/2016 |
| WO | WO2018086062 | 5/2018 |

OTHER PUBLICATIONS

Office Action for U.S. Appl. No. 16/531,996, dated Aug. 7, 2020, Cornwall, "Device and Battery Management in a Cellular Network", 10 Pages.

Non-Final Office Action dated Nov. 20, 2018 for U.S. Appl. No. 15/480,965 "Device and Battery Management in a Cellular Network" Cornwall, 10 pages.

Office Action for U.S. Appl. No. 16/237,233, dated Jul. 14, 2020, Dusenberry, "Battery Power Management for a Cellular Device", 11 pages.

Office action for U.S. Appl. No. 15/480,965, dated Jul. 18, 2018, Cornwall, "Device and Battery Management in a Cellular Network", 9 pages.

The PCT Search Report and Written Opinion dated Jun. 5, 2018 for PCT application No. PCT/US2018/020550, 13 pages.

The PCT Search Report and Written Opinion dated Jan. 7, 2020, for PCT Application No. PCT/US2019/054865, 14 pages.

The PCT Search Report and Written Opinion dated Apr. 2, 2020 for PCT Application No. PCT/US2019/054861, 14 pages.

Power Saving Mode (PSM) in UEs, MME Administration Guide, StarOS Release 21, unknown release date, retrieved Oct. 1, 2018, 6 pages.

Office Action for U.S. Appl. No 16/531,996, dated Jan. 8, 2021, "Device and Battery Management in a Cellular Network", 11 pages.

* cited by examiner

CELLULAR MODEM FOR LOW POWER APPLICATIONS

RELATED APPLICATIONS

This patent application claims priority to and the benefit of U.S. patent application Ser. No. 16/237,214, filed Dec. 31, 2018, titled "Cellular Modem for Low Power Applications," which claims priority to and the benefit of U.S. provisional patent application Ser. No. 62/742,194, titled "Cellular Modem for Low Power Applications", filed on 5 Oct. 2018, both of which are commonly assigned herewith, and hereby incorporated by reference.

BACKGROUND

In fixed-location, battery-powered cellular applications, it is known to provide higher power to a cellular modem during periods of communication, and lower power to the cellular modem during other periods. In one example, different power supplies are utilized, to provide approximately 500 mA during operation of communications functionality, and less than 10 uA during "sleep" periods. However, while providing different current levels to the cellular modem at different times is possible, inefficiencies in the design of power supplies result in a continuous current drain. Particularly for battery-powered devices, such current drain may be inconsistent with preferred design requirements.

Accordingly, there is a need for a cellular modem that is better adapted to low power situations.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
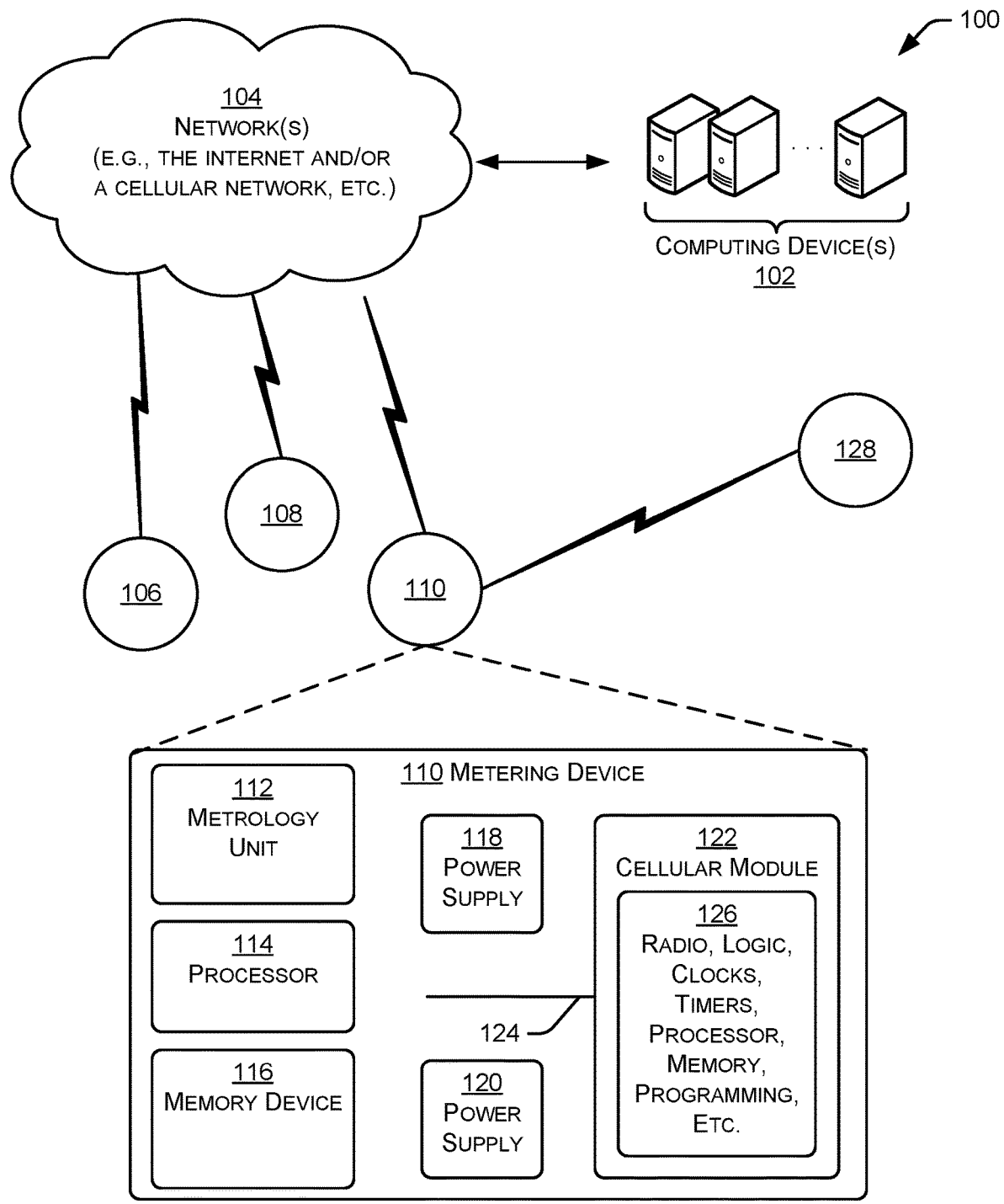
FIG. 1 is a block diagram showing an example system including at least portions of a smart natural gas or water distribution infrastructure, including gas or water meters that communicate within one or more cellular and/or mesh network(s), and a computing device.

The disclosure describes techniques for the structure and operation of a cellular modem adapted for low-power (e.g., battery-powered device) applications. The cellular modem is configured with software and/or operational logic (e.g., an application specific integrated circuit or ASIC) that controls aspects of processor(s), memory device(s), and a receiver, transmitter and/or transceiver for radio frequency (RF) communication with a cellular tower. In an RF communications mode, the transceiver exchanges information with the cellular tower, and receives an appointed time for a next communication with the cellular tower. The cellular modem then enters a low-power mode. Software or other logic executed by, or by a peripheral device for, the cellular modem during periods of operation at the low-power level may use inputs including the time of day, the time for the next communication, and information of a time period required to activate a power supply to support high-power operation (e.g., for RF reception and/or transmission) of the cellular modem. Using the inputs, the software determines a time, before the time of the next RF communication, at which the power supply must be activated, so that it is ready, in a just-in-time manner, to provide the cellular modem with the high-power level required for reception and/or transmission.

In an example, a cellular modem is configured with a general-purpose input/output (GPIO) pin, a dedicated pin, or other input and/or output pin. At the determined time, the cellular modem signals the power supply, such as by changing a voltage on the GPIO pin. Responsive to the change in voltage on the GPIO pin, the power supply transitions from a lower-power mode, sufficient to power the cellular modem in its lower-power mode, to a higher-power mode, sufficient to power the cellular modem in its higher-power mode. At the higher-power level, the power supply supplies more power than in the lower-power level. Accordingly, the power supply transitions from providing a lower-power level to providing a higher-power level in a just-in-time manner, to allow the cellular modem to transmit and/or receive RF communications from the cellular tower at the appointed time. Alternatively, two or more distinct lower-power, mid-power and/or higher-power power supplies may be used, and logic signaled by the GPIO pin may transition from use of one power supply to use of another power supply, as needed. Due to power supply power overhead and/or inefficiencies, the just-in-time nature of the power supply transition, which may be based on a signal from the GPIO pin, requires less power over time from the battery than if the power supply was configured to be always-available to accommodate a higher-power mode of the cellular modem. Accordingly, the battery-powered device will have additional battery life.

In a number of examples, reference is made to a power supply with multiple power levels, such as a lower-power level or mode, an intermediate-power level or mode, and/or a higher-power level or mode. In such cases, alternative examples are herein expressly made to the use of two or more power supplies. That is, while lower-power, intermediate-power and higher-power levels could be supplied by different modes of a single power supply, lower-power, intermediate-power and higher-power could alternatively be provided by a lower-power power supply, an intermediate-power power supply and a higher-power power supply, respectively. And still further, the intermediate-power level and the higher-power level could be provided by different modes of a first power supply, while the lower-power level could be provided by a second power supply.

Example System and Techniques

FIG. 1 shows a system 100 including a smart natural gas infrastructure, including gas meters that communicate using one or more cellular and/or mesh network(s), and a server, computing device and/or office. The system 100 may alternatively show a smart water supply infrastructure, including water meters that communicate with one or more cellular and/or mesh networks, and a server, computing device and/or office. In the example, computing device(s) 102 are in communication with a network 104. The network 104 may include the internet and/or a cellular network. The cellular network 104 and/or a data collector may be connected to a plurality of metering devices, including representative metering devices 106, 108 and 110.

Example structures of metering device 110 are shown. A metrology unit 112 is configured to measure natural gas, water or other consumable or disposable product or substance. A processor 114 is in communication with the metrology unit 112, to control the metrology unit 112 and to receive data generated by the metrology unit 112. A memory device 116 is in communication with the processor 114, and configured to store, provide, and/or manage metrology data, instructions for execution by the processor, and other information as needed.

One or more power supplies may be used to regulate battery power, and to provide one or more levels of current at one or more regulated voltage levels to one or more components in the metering device 110. In the example shown, a power supply 118 may be configured to provide higher levels of current to components within the metering device 110 during periods of radio frequency (RF) communication. A power supply 120 may be configured to provide lower levels of current to components within the metering device 110 during periods of sleep and/or inactivity of those components, and of the power supply 118. Alternatively, a single power supply could be configured to provide higher-current levels and lower-current levels in different modes of operation.

The metering device 110 may include a cellular modem 122 which may be configured for RF transmission and/or reception. The processor 114 may communicate with the cellular modem 122, such as to provide to, or receive data from, the modem. In an example, responsive to execution by the processor 114 of statements stored in the memory device 116, the processor may provide metrology data to the cellular modem 122 for transmission to computing devices 102 in the office of a utility company. In example operation, the processor 114 may direct and/or assist the cellular modem 122 to communicate periodically and/or at intervals with the network 104, cellular towers and/or radios within that network.

Alternatively, or additionally, the cellular modem or module 122 may contain hardware- and/or software-defined radio(s), internal processor(s), memory device(s), timer(s), clock(s), application specific integrated circuits (ASIC) and/or other device(s). These devices may be discrete devices or integrated into one or more ASIC devices. Accordingly, the cellular modem 122 may initiate and/or perform communications with the cellular towers and/or other networks. The terms modem and module are used to indicate a device having cellular functionality, and which may have some on-board processing ability and input/output abilities.

The cellular modem 122 may include one or more general purpose input/output (GPIO) pins 124 and associated logic 126 to control operation of those pin(s). In an example, the logic 126 may include one or more processor(s), memory device(s), programming instructions executable by the processor(s) within one or more of the memory devices, clock(s), timer(s), application specific integrated circuit (ASIC) device(s), input/output interface(s), and/or other structures.

In an example, the logic 126 may be configured to determine a time to signal one or more power supplies supplying power to the cellular modem and/or other devices within the metering device 110 to change a level of power that is provided. In the example, one or more pins, such as one or more GPIO pin 124 or other input/output or output pins, may be used to signal the power supply. The signal sent by the cellular modem 122 to the power supply may be a raised or lowered voltage on an output (e.g., the GPIO pin 124). Alternatively, the signal may be data bits sent by such a pin. Alternatively, the signal may be sent by the processor 114, which may manage the operation of one or more power supplies. One or more signals from one or more pins may have understood meaning(s), such as for the power supply to transition from one output power level or mode to another output power level or mode. Alternatively, signals from the GPIO pin of the cellular modem may instruct a first power supply device to enter a sleep or powered-down condition, and for another power supply device to enter a power supplying mode or condition. Examples include transitions in either direction between any of a low-power level or mode, a medium-power level or mode, and a high-power level or mode. Alternatively, or additionally, the signal from the cellular modem may cause one power supply (e.g., a power supply configured to provide a higher-level of power) to enter a sleep or powered-down mode, and another power supply (e.g., a power supply configured to provide a lower-level of power) to transition to a mode that provides power to one or more components. Thus, a power supply that has a lower quiescent current may provide lower-current power as the cellular modem (and possibly other components) is in a sleep mode. A power supply that has a higher quiescent current may provide higher-current power as the cellular modem (and possibly other components) are in RF transmission and/or reception modes. In an example, the higher-current providing power supply may be turned off when the lower-current providing power supply is turned on.

In an example, a lower-power mode of a power supply (or a lower-power power supply if two or more power supplies are available), may be suitable for operating logic (e.g., processor, memory, etc.) on the cellular modem, but may be insufficient to operate either of a receiver or a transmitter. A medium-power mode, or medium-power power supply, providing power to the cellular modem, may be suitable for operating logic and/or the receiver of the cellular modem, but not the transmitter of the cellular modem. A higher-power mode, or higher-power power supply, providing power to the cellular modem, may be suitable for operating a receiver and/or a transmitter of the cellular modem, or suitable for rapid transitions between the receiver and transmitter.

Accordingly, the logic 126 and an output (e.g., a GPIO pin 124) on the cellular modem can be used to efficiently control the operation, including selection of a mode of a power supply, or selection of a power supply to be operated, and to thereby overcome inefficiencies plaguing previous designs.

Advantageously, an output level of the power supply may be changed (or the power supply device in used changed) in a just-in-time manner. That is, when foreknowledge of a time of transition (e.g., the beginning or ending of a period of RF reception or RF transmission) is available, the power supply or supplies can be transitioned to meet the power and/or conservation needs at the correct time. Advantageously, the output power level of the power supply (or the power supply used) is changed to a level that is appropriate for the activities that are being performed or that will be performed. In an example, the power level mode of a power supply (and/or the power supply used), may be changed to match the needs of the sleep, RF reception and RF transmission states of the cellular modem.

In the example of FIG. 1, a metering device 128 may be configured for RF communication with a nearby network node, e.g., metering device 110. The RF communication may be considered a "mesh" network, which may allow information to flow between one or more devices using one or more technologies before reaching computing device 102. The metering device 128 may have a communications system similar to that of metering device 110, allowing the devices 110, 128 to communication in a low-power manner over the mesh network, such as according to the discussion herein.

Figure 2:
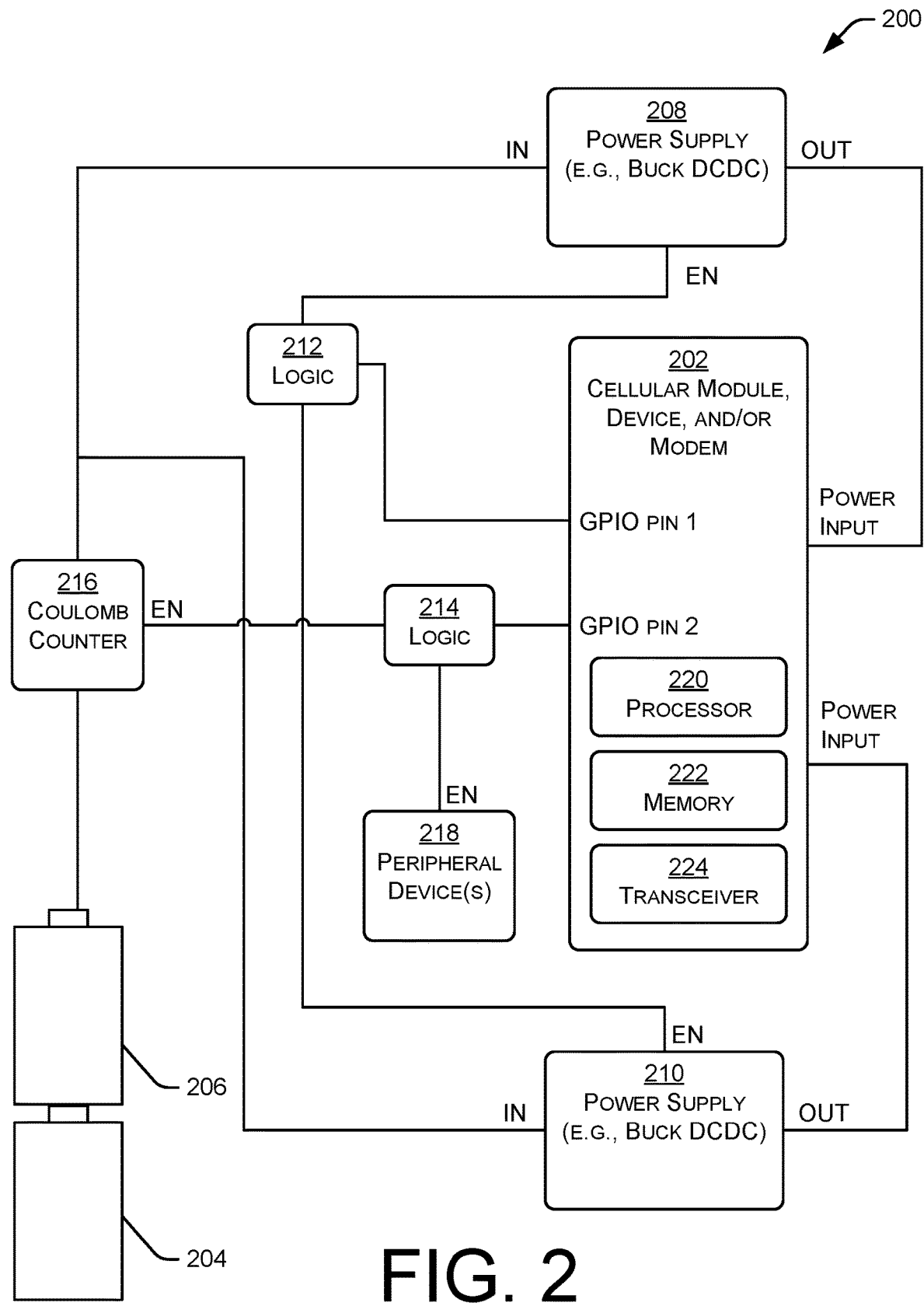
FIG. 2 is a block diagram describing an example low-power cellular modem supported by a higher-current power supply (e.g., for RF transmission and/or reception) and a lower-current power supply (e.g., for sleep functions).

FIG. 2 shows example structure of a communications system 200 including a cellular modem 202 in a lower power (e.g., battery-powered) application. Such applications may include utility metering, mobile communications, the internet of things, and other low-power applications. In the example shown, batteries 204, 206 provide unregulated power to the communications system 200, although power could alternatively be provided by one or more batteries or other power source(s). However, devices within the system, such as the cellular modem 202, may require one or more current-levels at one or more regulated voltages during different modes or operation and/or one or more activities. Accordingly, power supplies 208, 210 may be used to receive unregulated power from the batteries and to provide voltage-regulated power to the cellular modem 202 and/or other components. The power supplies 208, 210 may provide the system 200 with different current-levels, in a manner that is more efficient than a single power supply. In the example shown, one or more power supplies may be configured as a buck converter. In operation, the power supplies may be used to step-down voltage and step-up current. However, other voltage and/or current regulating devices may be used.

Collectively, the power supplies 208, 210 provide at least two levels of power to the cellular modem 202. In the example shown, the cellular modem 202 may have one or more power inputs, each of which may correspond to an input power level. Alternatively, the cellular modem 202 may have a single power input pin, which receives different levels of power.

Operating to provide the higher-power level, the power supply 208 may deliver 200 mA or more of current (e.g., 500 mA), at 2 to 6 volts (e.g., 3.7 volts). In the high-power mode, the cellular modem 202 may operate as a transceiver, to perform RF transmissions and receptions. Accordingly, data may be transmitted upstream (e.g., to the office servers) and commands, schedules, data, hand-shaking and/or other information may be received.

Operating to provide the lower-power level, the power supply 210 may deliver 50 uA or less of current (e.g., 2 uA to 10 uA) at 2 to 6 volts (e.g., 3.7 volts), to the cellular modem 202. Such a power level allows clocks, timers and/or minimal processing to be operated or performed. Additionally, the GPIO pins may be activated during the lower-power level, such as to signal a need for a transition to a higher-power level. By operating the processor, clocks, timers and/or GPIO pins, the cellular modem (or alternatively a peripheral device) may determine, and be ready at, the appointed time of a future RF communication.

In some instances, the "appointed time" may include status change in a communication, such as a start time and/or a stop time of the communication. In some examples, the appointed time may include status changes such as time(s) of transition between transmission and reception and/or between reception and transmission. In some examples, the appointed time may include status changes that define idle and/or sleep times. Idle periods may provide sufficient power to wake a component in less time that is required to wake a component from a sleep period.

The cellular modem 202 may receive power at an intermediate level, i.e., a medium-power level or mode, which is greater than the low-power mode and less than the high-power level. In the medium-power level, the cellular modem is able to perform RF reception, but the power level is too low to allow RF transmissions. In example use of the medium-power level, the cellular modem may conclude a communication with a cellular tower by receiving, but not transmitting, data. In a second example, of the medium power level, the cellular modem may turn on at an appointed time, receive a time update, reset its clock, and return to a low-power mode. Accordingly, when receiving data, a lower level of power may be delivered by the power supply 208 than is used during transmission.

The cellular modem 202 may provide one or more general-purpose input/output (GPIO) pins. The GPIO pin(s) may be controlled by one or more of processor(s), clock(s), timer(s) and/or programming within the cellular modem. The GPIO pin(s) may send signal(s) according to programming, such as by raising or lowering a voltage level of the pin, or by output of one or more "bits" of data, which may be formed by a square wave or other signal from the GPIO pin. In an example, the cellular modem 202 may have a processor and/or timer that counts down to an upcoming scheduled communication with the cellular tower. At the conclusion of the timed period, the GPIO pin may signal the power supply to begin a start-up period, so that it will provide either high-power or medium-power to the cellular modem 202 at or before the appointed time for the cellular modem to begin communication with the cellular tower.

In some example systems, one or more GPIO pins may be connected a logical device or devices 212, 214. The logical devices 212, 214 may provide gates, timing and/or other tools to provide appropriate signals to one or more peripheral devices (e.g., devices other than the cellular modem 202). In the example shown, logical device 212 provides signals to both power supplies, allowing a first GPIO pin to control operation of the power supplies. The logical device 214 allows a second GPIO pin to control operation of the Coulomb counter 216 and one or more peripheral devices 218. The logic devices 212, 214 are shown as two devices; however, they could be combined into a single logical device and/or could be defined on a single integrated circuit.

In the example of FIG. 2, a Coulomb counter 216 receives current from the batteries 204, 206, and provides the current to the power supplies 208, 210. Accordingly, the Coulomb counter 216 is in position to measure current flow from the batteries to the power supplies. The Coulomb counter 216 may provide current flow information to the processor 220 of the cellular modem 202, or to a processor 114 of the metering device (as seen in FIG. 1), for storage in a respective memory device 116, 222 or for transmission to a remote computing device 102. An enable pin of the Coulomb counter 216 may be connected to, and controlled by, logic 214 controlled by a GPIO pin of the cellular modem 202.

In the example of FIG. 2, the cellular modem 202 be configured with a processor 220, memory device 222 and/or a transceiver 224. In some examples, the cellular modem 202 incorporates one or more of the devices 220, 222, 224 into one or more discrete, combined, and/or mixed-purpose circuits or integrated circuits, circuit boards, devices, modules, chip sets, etc. Accordingly, the processor, memory and radio functionality may be distributed over portions of one or more integrated circuits of the cellular modem. Accordingly, any reference to the processor, memory and/or transceiver of the cellular modem refers to that distribution, and may refer to a device within the modem, or portion(s) of one or more devices.

Figure 3:
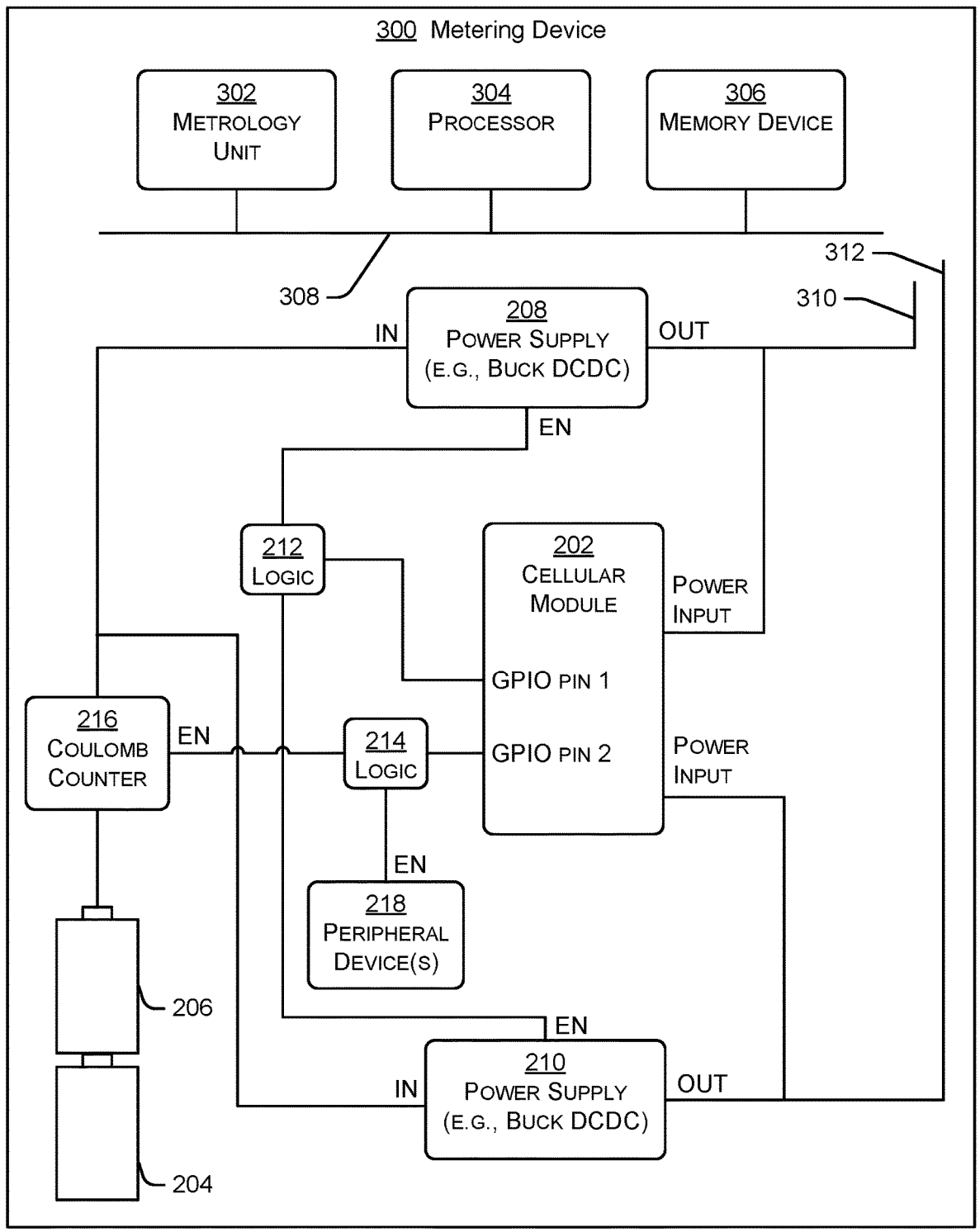
FIG. 3 is a block diagram of an example gas or water meter, showing processor, memory, metrology and communications devices, and showing higher-current and lower-current power supplies controlled by logic device(s) controlled at least in part by a GPIO pin of a low-power cellular modem.

FIG. 3 shows an example structure of a metering device 300 including a cellular modem 202 in a low-power (e.g., battery-powered) application. In the example, GPIO pins signal logic devices 212, 214, which control two power supplies and peripheral devices, respectively. A metrology unit 302 creates metrology data in response to resource measurements. A processor 304 communicates (e.g., over power, data and/or control bus 308) with the metrology unit 302 and stores the metrology data in a memory device 306. The stored metrology data may be sent to a remotely located computing device, such as the servers or home office 102 of FIG. 1.

An output 310 of the higher-current power supply 208 may provide higher levels of current to one or more devices (not shown). An output 312 of the lower-current power supply 210 may provide lower levels of current to one or more devices (not shown).

Figure 4:
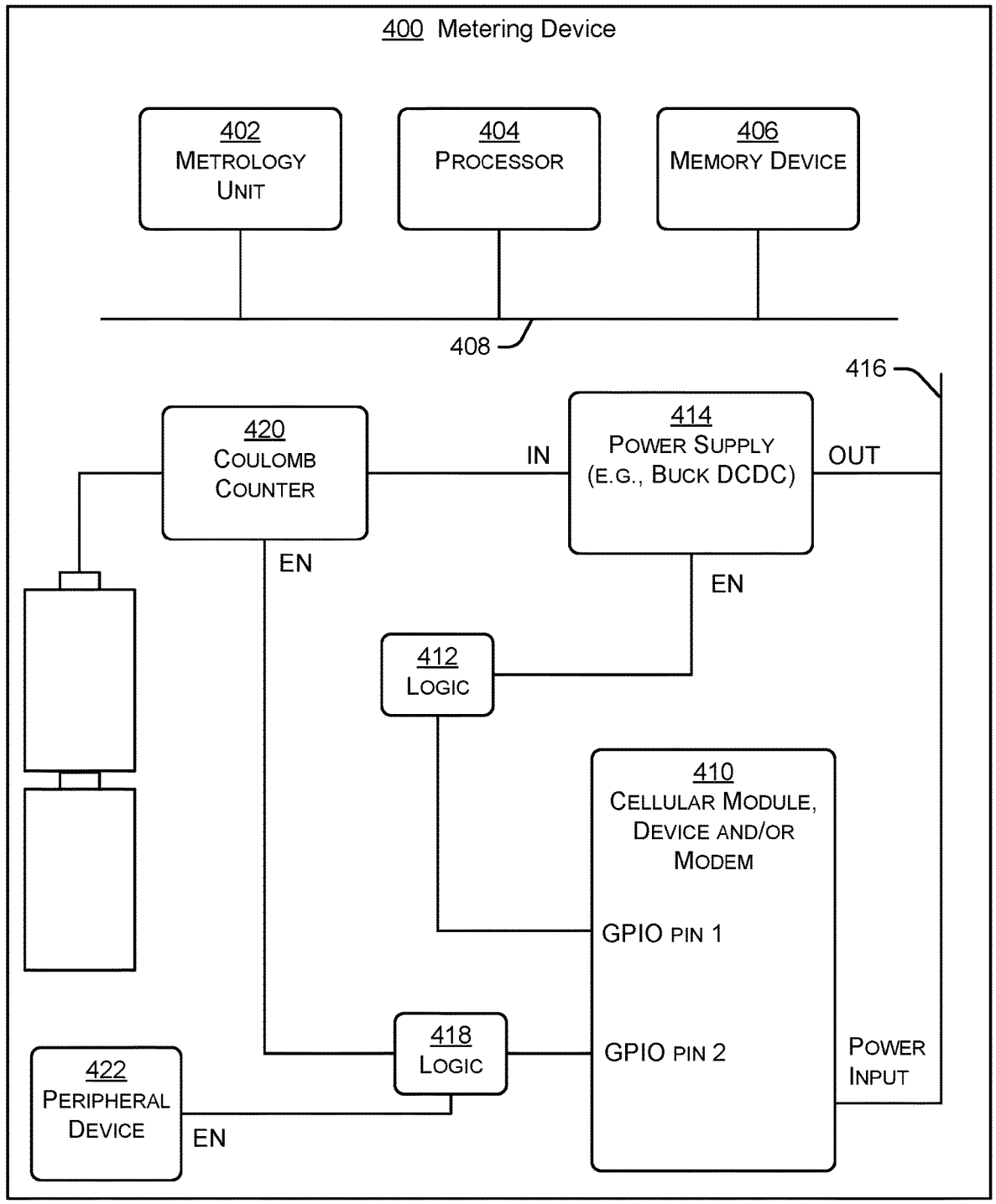
FIG. 4 is a block diagram of an example gas or water meter, showing processor, memory, metrology and communications devices, and showing a power supply having higher-current and lower-current modes of operation controlled by logic device(s) controlled at least in part by a GPIO pin of a low-power cellular modem.

FIG. 4 shows an example structure of a metering device 400, having a cellular modem 402 configured for low-power (e.g., battery-powered) operation. A metrology unit 402, processor 404 and memory device 406 communicate over a bus 408 in a manner similar to corresponding components in the metering device 300.

A cellular modem 410 includes two GPIO pins. A first GPIO pin is configured to send signals to logic 412 to control a single power supply 414. The power supply 414 may be configured with two or more modes, allowing it to provide lower-current levels when the cellular modem 410 is in a sleep or low-power mode, and/or mid-current levels for when the cellular modem is performing RF reception, and/or higher-current levels for when the cellular modem is performing RF transmission or rapid alternation between reception and transmission. The power supply 414 may provide power to a plurality of devices using output 416.

The cellular modem 410 may include a second GPIO pin, which provides signals to logic 418, to thereby control aspects of the operation of the coulomb counter 420 and/or one or more peripheral devices 422.

In an alternative, the second (or a third) GPIO pin may control a second (or a third) power supply, instead of, or in addition to, the peripheral device 418. In an example, first, second and optionally third GPIO pins may control first, second and optionally third power supplies, respectively. In the example, the power supplies may be sized for sleep, reception and transmission modes, respectively. Each GPIO pin may be controlled by programming and/or logic (e.g., within, or in communication with, the cellular modem), and may be configured to turn on and off a respective power supply before, at, or after an event, event-beginning and/or event-conclusion. Events may include periods of transmission, periods of reception and/or sleep periods. In an example, before, as, or after, one GPIO pin turns off a power supply providing sufficient power for RF transmission, another GPIO pin may turn on a power supply providing sufficient power for RF reception. In a further example, before, as, or after, one GPIO pin turns off a power supply providing sufficient power for RF reception, another GPIO pin may turn on a power supply providing sufficient power for sleep functions of the cellular modem and/or network endpoint or metering device.

In an example applicable to the systems and devices of FIGS. 1 through 4, output of the Coulomb counter can be used to determine an operation mode of the cellular modem. In several related examples, loss of a signal or communication with the tower, a configurational failure, an operational failure, a hardware failure, etc., can be detected by the Coulomb counter. The detection may be made based at least in part on a magnitude of the current and/or power measured at the Coulomb counter. In an example, a hardware failure of a device on a meter (e.g., a metrology unit) may result in less measured current. In response, output from the Coulomb counter (perhaps passing through one or more logical devices) may activate the cellular modem, which may be notify a computing device (e.g., computing device 102 of FIG. 1) of the hardware failure.

In a further example, output of the Coulomb counter can also be used to signal asynchronous events such as unscheduled events, alarm conditions, unscheduled data transmissions, etc. In a related example, the Coulomb counter may detect a higher than average rate of change in current consumption, or a current increase relative to past measurements. In the example, the Coulomb counter may signal a system exception if the event is not scheduled. The Coulomb counter may also signal the power supply (or supplies) and the cellular modem, to enable reporting of the system exception.

In a further example, the Coulomb counter may implement a threshold for a minimum current measurement. The threshold may be variable, adjustable, controllable and/or programmable. In a related example, operations of the Coulomb counter may be based on synchronous and/or asynchronous events. A synchronous event may include a scheduled logic input as illustrated. In an example, a synchronous event may utilize an increase in the relative rate of current consumption as in an asynchronous event. The variable threshold is intended to compensate for environmental and battery aging.

In an example configuration, the Coulomb counter operates in a high resolution (i.e., high sample-rate of the current flow) mode upon receipt of a signal from a GPIO pin of the cellular modem, or upon exceeding an excess-current threshold. In other operational states, the Coulomb counter will not be enabled and consequently will not gauge the current flow. During low-power (e.g., standby or "sleep" periods of time) low power timers may be used to track the duration of time that devices (e.g., the cellular modem) are in this state. The characteristic current requirements will be known for the low-power state. Consequently, the overall battery consumption can be understood as a summation of the low-power state consumption and the higher-power gauged state provided by the Coulomb counter. In an example, the Coulomb counter will measure current in units of micro Amp per second. In a further example, a threshold current value may be set at the cellular modem, based on at least one of an ambient temperature and/or an age of a battery powering the cellular modem. A time to signal one or more power supplies, to adjust a level of current being supplied, is determined based at least in part on the threshold current value and input regarding current values from a Coulomb counter.

Example Methods

In some examples of the techniques discusses herein, the methods of operation may be performed by one or more application specific integrated circuits (ASIC) or may be performed by a general-purpose processor utilizing software defined in computer-readable media. In the examples and techniques discussed herein, the memory may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

FIGS. 5 through 10 are flow diagrams showing example processes that are representative of techniques for use in low-powered devices, such as battery-powered metering devices, mobile communications devices, devices in the internet of things, etc. The processes may, but need not necessarily, be implemented in whole or in part by the metering device, communications system, and/or cellular modem.

Figure 5:
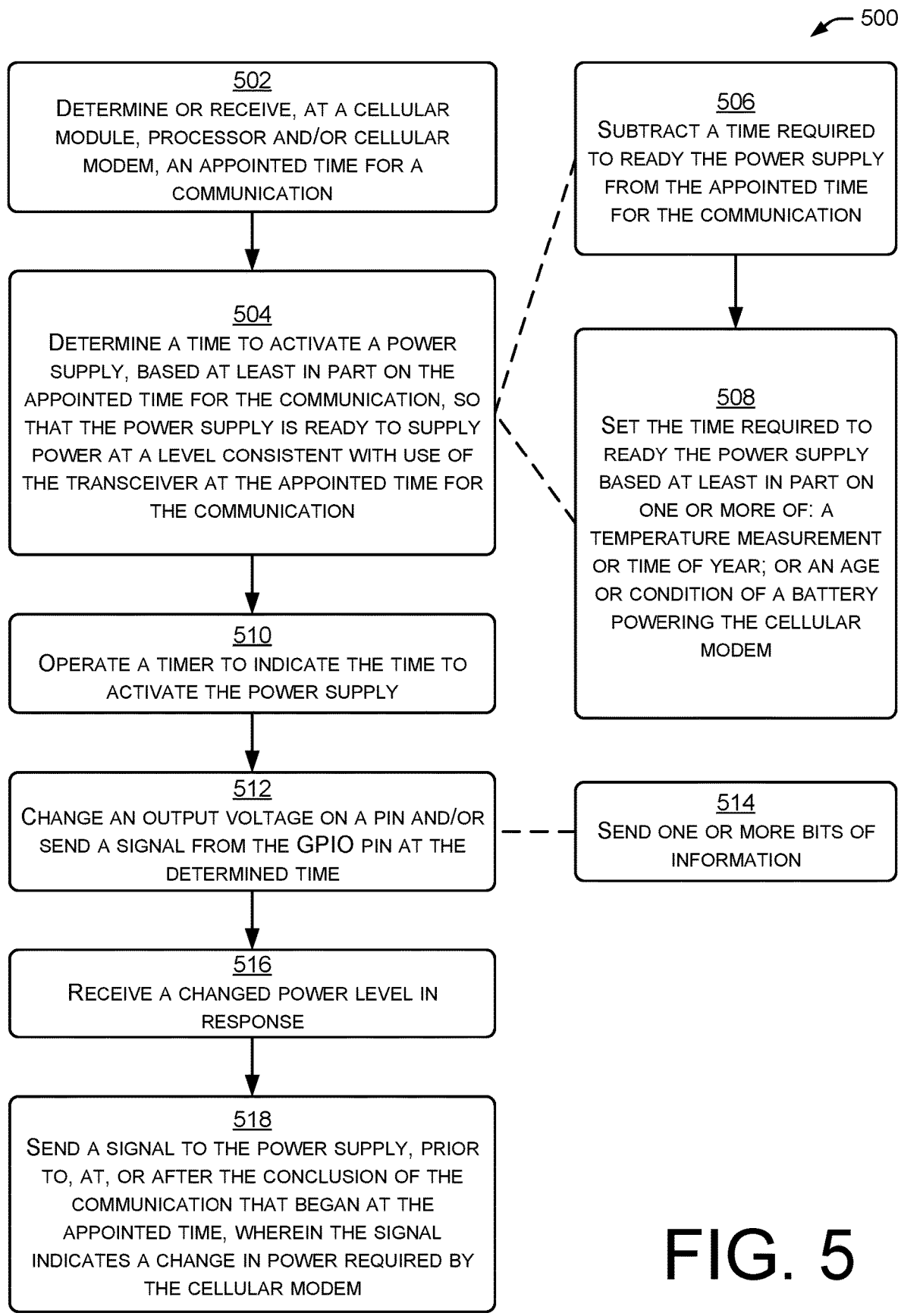
FIG. 5 is a flow diagram describing example operation of a cellular modem in a low power application.

FIG. 5 is a flow diagram describing example operation 500 of a cellular modem (or other radio) in a low-power or battery-powered application, such as a metering device. At block 502, an appointed time for a future communication is received. Data indicating the time may be sent by a remote computing device, a central office, data collector, server and/or cellular tower, and may be received by the transceiver (e.g., of a cellular modem or other radio). The cellular modem may send the data to a processor within a metering device where the data is received. In an example, a series of appointed times are received at the cellular modem, and may be a part of a series of respective communications. Accordingly, some or all communications may receive an appointed time for a next communication with the cellular tower.

At block 504, a time to activate a power supply is determined. The time to activate the power supply may be based at least in part on the appointed time of an upcoming communication, and the need to power the cellular modem in time for that communication. The communication may be an RF reception and/or an RF transmission. In one example, the power supply may be activated enough before the appointed time that it is ready to supply power at a level consistent with consumption requirements of the receiver, transmitter and/or transceiver, for transmission and/or reception. In the example of block 506, the time required to ready the power supply may be subtracted from the appointed time for the communication. Alternatively, the transmission may take place after the power supply becomes ready to supply power at the appropriate current and voltage levels. In the example of block 508, the time required to ready the power supply may be based at least in part on the temperature, or the time of year, which may be a crude estimation of the temperature. In the example, the colder the temperature is, the longer it may take the power supply to activate sufficiently to power the cellular modem and/or other devices. Additionally, the time required to ready the power supply may be based at least in part on the age, temperature and/or condition of the battery or other devices within the cellular modem and/or a metering device within which the modem is located. In the example, the older or colder (in temperature) the battery, power supply and/or other device is, the longer it may take the power supply to activate sufficiently to power the cellular modem and/or other devices.

In the example of block 510, a timer or clock may be operated (e.g., within the metering device, or specifically within the cellular modem). The timer may count down (or up) to the time at which the power supply should be activated. At block 512, when the timer indicates arrival of the determined time (e.g., the time determined at block 504), a signal is sent from the GPIO pin of the cellular modem to the power supply (directly or through logic, as in FIG. 3), indicating that the power supply should begin to wake up. The signal may be a raised (or lowered) voltage on the GPIO pin of the cellular modem. In some instances (e.g., at block 514), the signal may be a sequence of raised and lowered voltage levels, bits, packets or other data. Such a signal, while more complex and having higher energy and time costs, may have advantages in some instances, such as where different components require different quantities of power at different times.

At block 516, a changed power level is received, such as at the cellular modem, in response to the signal sent by the GPIO pin at block 512. Accordingly, the cellular modem receives the power needed to transmit and/or receive data.

In some instances, the cellular modem may have data or information that is sufficient to recognize or deduce that some functionality is no longer needed. For example, the cellular modem may have reached a point in the communication where it is done transmitting, and will only receive data until the end of the communication. In another example, a peripheral device, such as a coprocessor, may be turned off when not needed. Accordingly, at block 518, a signal may be sent to the power supply prior to, at, or after the conclusion of the communication that began at the appointed time, wherein the signal indicates a change in power required by the cellular modem, a processor, coprocessor, or other power-consuming device. The signal for a change in power needs may be anticipated, concurrent, or after an event, such as the conclusion of an RF transmission, RF reception or other activity.

Figure 6:
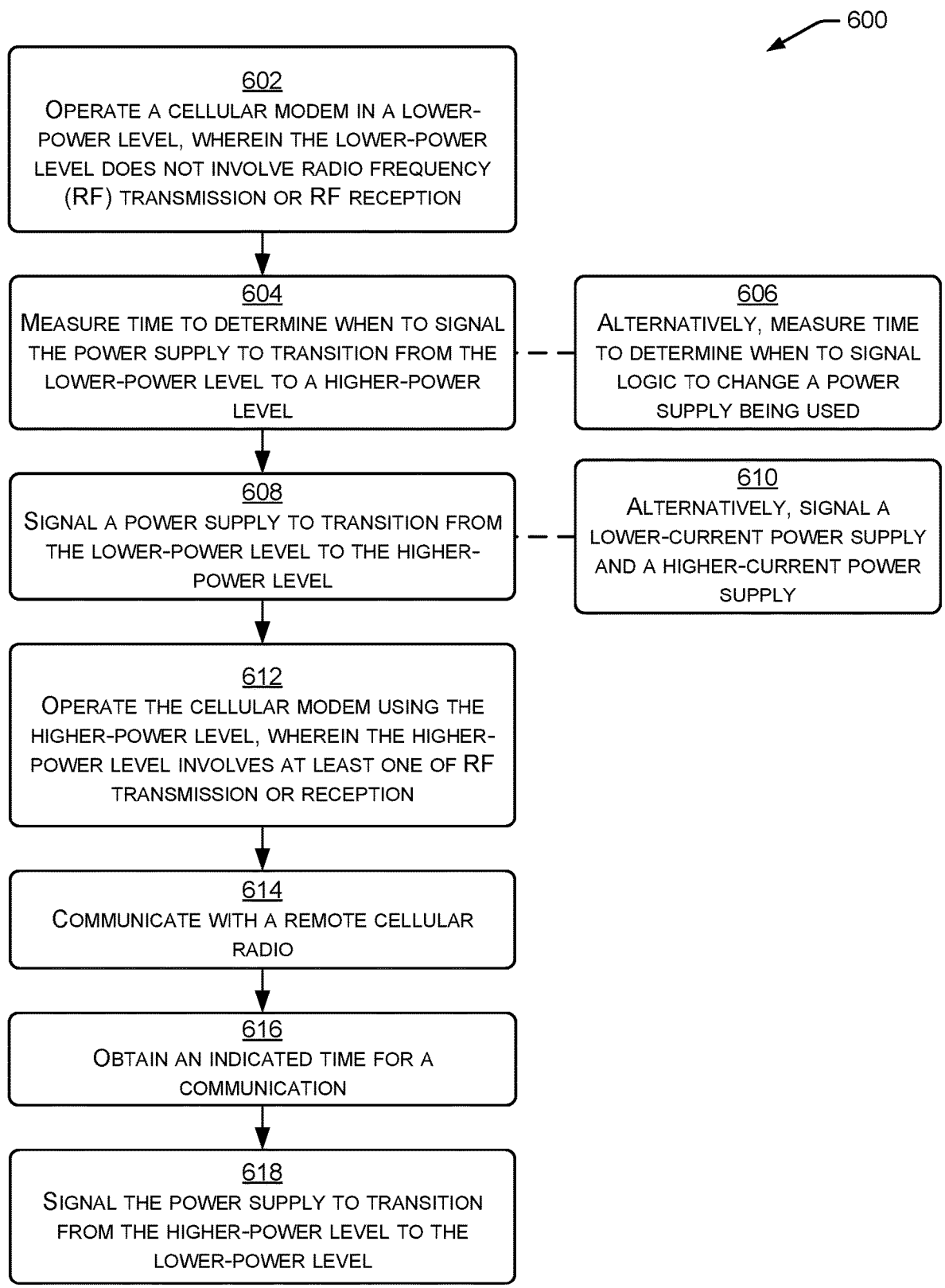
FIG. 6 is a flow diagram describing example operation of a cellular modem in a low power application.

FIG. 6 shows example operation 600 of a cellular modem (or radio of other type or technology) in a low-power application. At block 602, a cellular modem may be operated in a low-power mode, wherein the low-power mode does not involve radio frequency (RF) transmission or RF reception. The low-power mode may be considered a "sleep mode," and the cellular modem may perform tasks such as running a timer related to the ending of the sleep mode.

At block 604, time may be measured, such as to determine when to signal the power supply to transition from the low-power sleep mode to a high-power mode suitable to power a transceiver, or a medium-power mode suitable to power a receiver. Alternatively, time may be measured, to determine when to signal a first power supply (which may supply a higher-power level) to turn off, and a second power supply (which may supply a lower-power level) to turn on. Block 604 applies, for example, to the system of FIG. 4, wherein a single power supply transitions between a lower-power mode to a medium-power or higher-power mode. Alternatively, at block 606, time is measured to determine when to signal logic to change a power supply being used. Block 606 applies, for example, to the system of FIG. 3, wherein dual power supplies are used, one for times of lower-current requirements and one for times of higher-current requirements.

In an example, the signal may be sent at a time that considers the time required, by one or more power supplies or other components, to transition between a lower-power mode, an intermediate-power mode, and/or a higher-power mode. The time required to transition one or more power supplies between modes, and thus the timing of the signal, may be based at least in part on: an ambient temperature; a time of year; an age of a battery powering the cellular module; the data or signal obtained from a Coulomb counter; or a fixed period of time (i.e., the time required may be set to a default time period that is calculated to provide at least enough time for a power supply to turn on and/or off). Thus, battery age, ambient temperature, and other factors may be considered when timing a signal to a power supply (or power supplies) to transition between power levels.

At block 608, a signal may be sent to one or more power supplies, indicating that the one or more power supplies should begin a transition from the lower-power mode to a higher-power mode. The signal may by a change in the voltage of an output pin (e.g., a GPIO pin) of the cellular module. In an example, one power supply may transition from one current-level or mode of operation to another current level or mode of operation. In a further example, one power supply (e.g., a lower-current power supply) may become inactive, and a second power supply (e.g., a higher-current power supply) may become active, or the reverse. In example current levels, the power supply may provide 3 to 5 volts at 10 uA or less during the low-power mode, and similar voltage at 500 mA during high-power mode. Block 608 applies, for example, to the system of FIG. 4, wherein a single power supply transitions between a lower-power mode to a medium-power or higher-power mode. Alternatively, at block 610, a signal may be sent to a lower-power power supply, causing that power supply to turn off or transition to a sleep mode. An additional signal is sent to a higher-power power supply, causing that power supply to turn on or wake up, to ready it to provide the required higher-current level. Block 610 applies, for example, to the system of FIG. 3, wherein dual power supplies are used.

At block 612, the cellular modem is operated at the high-power mode, wherein the high-power mode involves at least one of RF transmission or reception. In some example implementations, the power supply provides a medium-power mode to operate the cellular modem for reception, and a high-power mode for transmission and/or transmission and reception.

At block 614, the cellular modem communicates with a remote cellular radio. The communication may upload data (e.g., consumption data) and download instructions, time of day data, time of next communication data, etc.

At block 616, an indicated time for a next or subsequent communication is obtained by the cellular modem. In an example, a metering device such as a gas meter or water meter, receives a time for the next check-in with a data collector or main office. The cellular modem may transfer the data to a processor and memory and/or retain the data within the cellular modem so that a timer may be set and the GPIO pin activated at the correct time.

At block 618, a signal is sent to the power supply to transition from the high-power mode to the low-power mode. In an example, at (or before) the conclusion of a transmission, the cellular modem may send the power supply a signal, indicating the need to transition from high-power mode to either medium-power mode or low-power mode.

Figure 7:
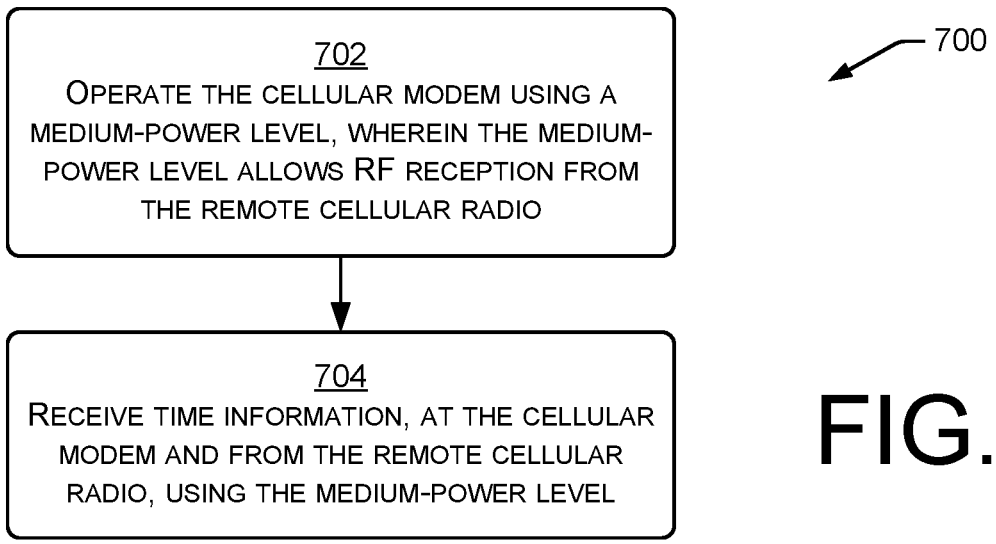
FIG. 7 is a flow diagram describing example operation of a cellular modem, illustrating use of a plurality of power levels for sleep and receiver and transceiver modes of operation.

FIG. 7 shows example operation 700 of a cellular modem, illustrating use of a plurality of power levels for sleep, receiver-only, and transceiver modes of operation. At block 702, the cellular modem is operated using a medium-power mode. The medium-power mode allows RF reception from the remote cellular radio, but not transmission. The medium-power mode, or receiver-only mode, may be used during portions of a communication during which the tower is transmitting data and the cellular modem is able to identify a window of time during which it will be reception-only (i.e., not transmitting). The medium-power mode, or receiver-only mode may be used during an end-portion of a communication, after the cellular modem has uploaded its data and has no expectation of further need to transmit data. In the example of block 704, the cellular modem may receive time information from the remote cellular radio (e.g., a cellular tower in networks 104 of FIG. 1) or remote computer (e.g., computer 102 of FIG. 1), using the medium-power mode. In some examples, the cellular tower or server directed the content of a message to the cellular modem may structure a communication to allow the cellular modem to transition to a medium-power, receiver only, mode of communication as soon as possible.

Figure 8:
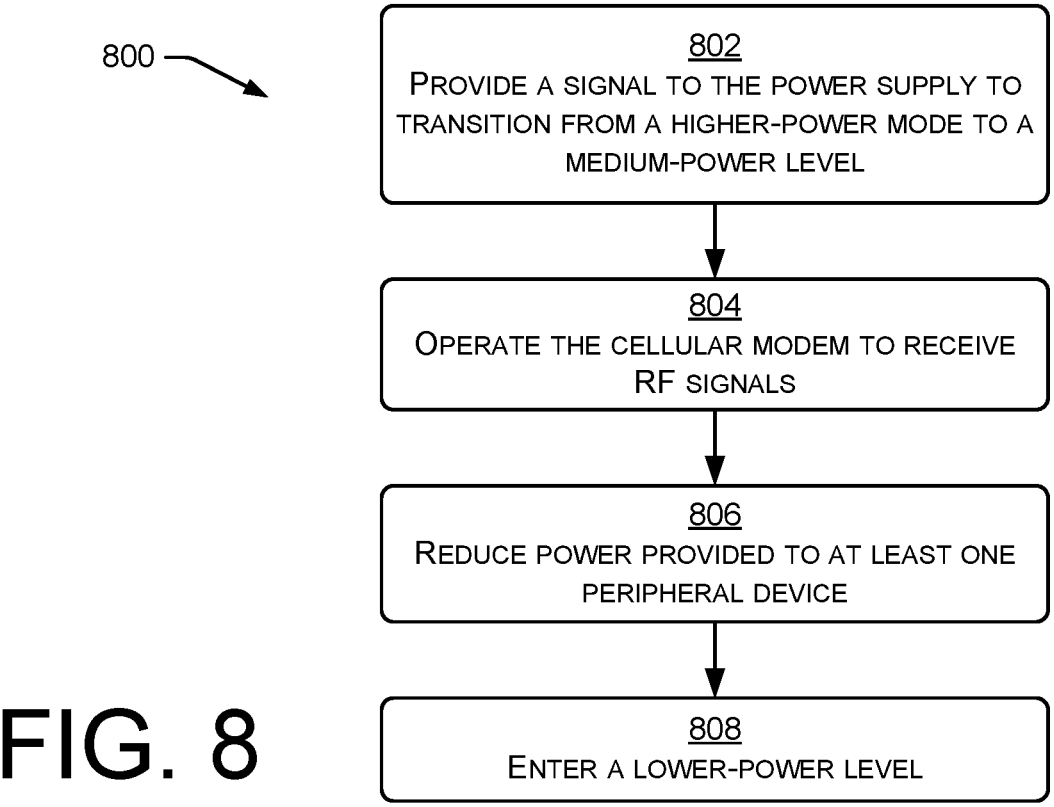
FIG. 8 is a flow diagram describing example operation of a cellular modem of a device, such as in a metering device, illustrating use of a plurality of power levels for sleep and receiver and transceiver modes of operation.

FIG. 8 shows example operation 800 of a cellular modem, such as in a metering device, illustrating use of a plurality of power levels for sleep, receiver and transceiver modes of operation. At block 802, a signal is provided to the power supply, directing the power supply to transition from high-power level to a medium-power mode. At block 804, the cellular modem is operated to receive RF signals. In the example, operation in a receiver-only mode consumes less power than in a mode of operation that includes transmission of data. At block 806, power provided to at least one peripheral device may be reduced. In an example, power may be reduced or turned off to a processor, coprocessor or other device. At block 808, the low-power mode is entered. In an example, high-power and medium-power modes occupy less overall time than a low-power sleep mode. The time required to upload consumption data is much less than the time required to acquire such data.

Figure 9:
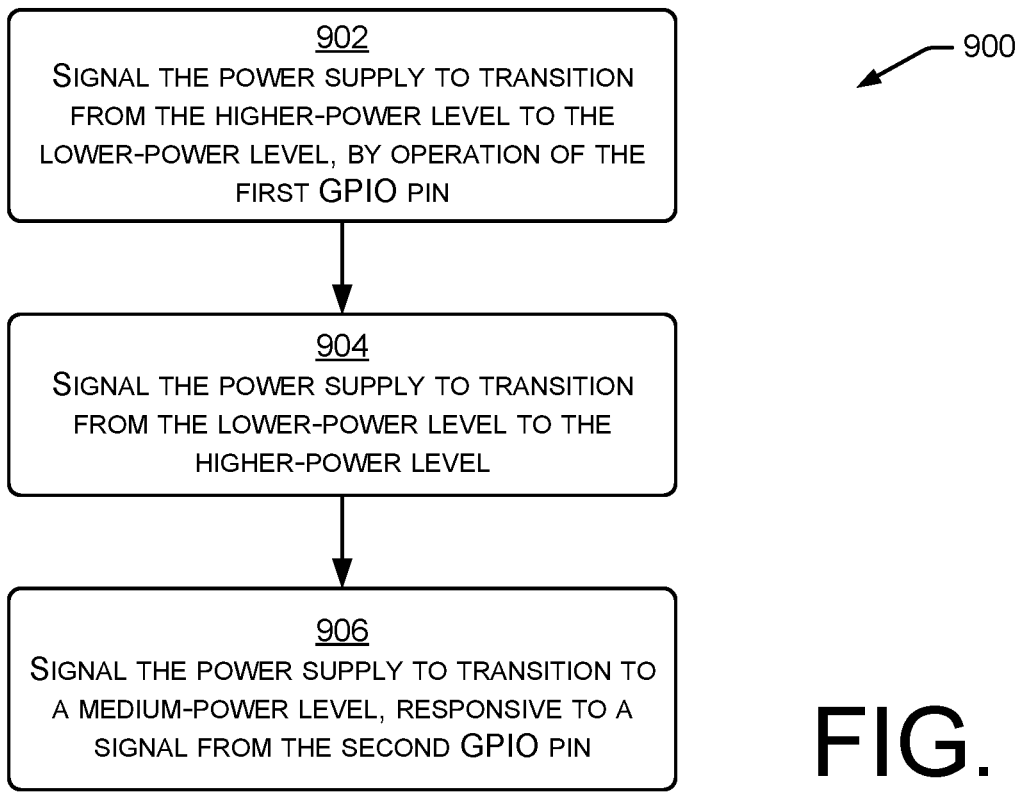
FIG. 9 is a flow diagram describing operation of a cellular modem, showing example implementation and operation of additional GPIO pins.

FIG. 9 shows operation 900 of a cellular modem, showing example implementation and operation of additional GPIO pins. At block 902, a signal is sent to the power supply to transition from the high-power mode to the low-power mode, by operation of the first GPIO pin of the cellular modem. At block 904, a signal is sent to the power supply to transition from the low-power mode to the high-power mode, by operation of the first GPIO pin of the cellular modem. Accordingly, the first GPIO pin may be used to transition the power supply between high-power and low-power modes. The high-power and low-power modes may be associated with operation of a transceiver of the cellular modem and with operation of a timer or minimal processing performed by the cellular modem, respectively. At block 906, a signal from a second GPIO pin is used to signal the power supply to transition to a medium-power mode. The medium-power mode may be sufficient to power the receiver of the cellular modem, and to use the receiver to download information such as time of day, time of next communication with the cellular tower, etc.

Figure 10:
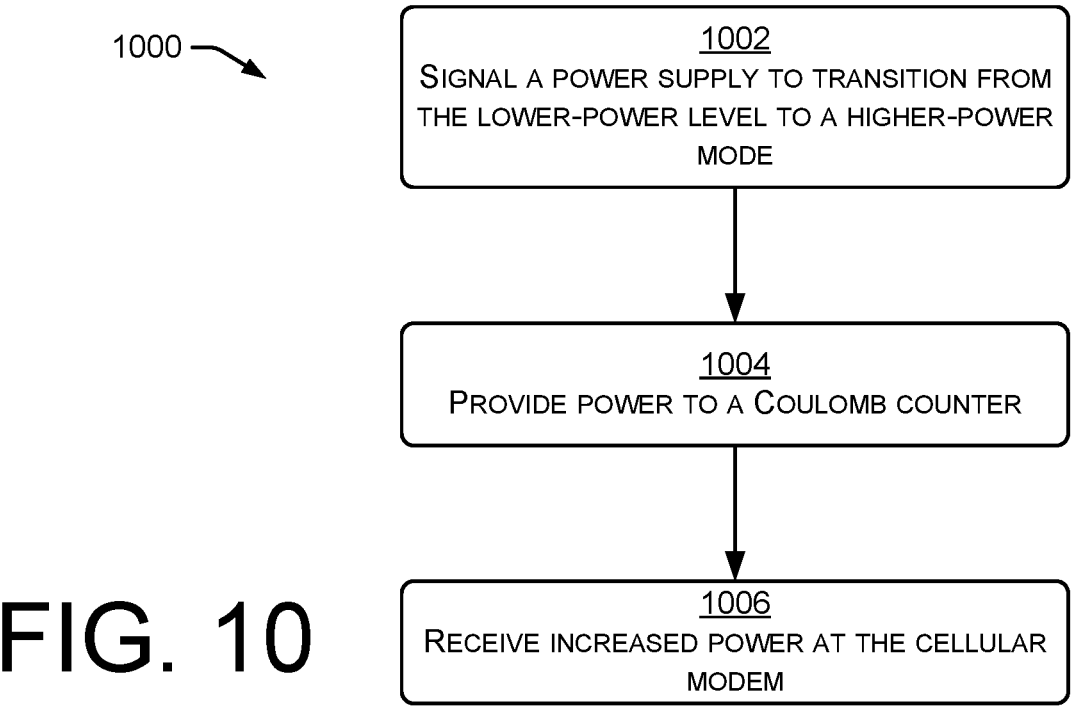
FIG. 10 is a flow diagram describing operation of a cellular modem, showing an example by which power levels provided to two or more devices may be changed in a sequential manner.

FIG. 10 shows example operation 1000 of a cellular modem, including techniques by which power levels provided to two or more devices may be changed in a sequential manner. In an example, activation of a Coulomb counter prior to activation of a high-power mode in a power supply results in measurement of the increased current flow as it begins. In the example of FIG. 3, logic device 302 activates the power supply 208 after receiving an input from the Coulomb counter 210 indicating that it is in operation. Accordingly, the Coulomb counter and power supply are activated in a sequential manner. At block 1002, a cellular modem sends a signal (e.g., by changing a voltage on a GPIO pin) commanding the power supply to transition from the low-power mode to a high-power mode. In the example of FIG. 3, the signal from GPIO 1 is sent to an input of the logical AND gate. At block 1004, the logical AND gate outputs a "true" signal, which is sent to the enable pin of the power supply. Accordingly, the power supply is activated. At block 1006, the cellular modem receives increased power, which is only received after the Coulomb counter is activated and able to measure the associated current flow.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method, comprising:
under control of one or more processors configured with executable instructions:
operating a cellular module at a first power level, wherein the first power level is used between periods involving radio frequency (RF) transmission and/or RF reception, and while operating using the first power level:
changing a voltage on an output pin to signal a transition from the first power level to a second power level, wherein the second power level is greater than the first power level; and
operating the cellular module using the second power level, wherein operating the cellular module in the second power level comprises at least one of RF transmission or reception, and while operating in the second power level:
communicating with a remote cellular radio;
obtaining an indicated time for a communication; and
signaling one or more power supplies to transition from the second power level to the first power level.
2. The method of claim 1, wherein, operating using the first power level, the cellular module performs actions comprising:
determining a time prior to the indicated time to signal the one or more power supplies to transition from the first power level to the second power level.
3. The method of claim 1, additionally comprising:
calculating a time-requirement for the one or more power supplies to transition from the first power level to the second power level, wherein the calculating is based at least in part on:
an age of a battery powering the cellular module; or
a fixed period of time.
4. The method of claim 1, additionally comprising:
operating the cellular module using a third power level, wherein the third power level is greater than the first power level and less than the second power level, and wherein the third power level provides sufficient power to the cellular module to perform RF reception; and
receiving time information, at the cellular module and from the remote cellular radio, while the cellular module operates using the third power level.
5. The method of claim 1, additionally comprising:
providing a first signal to the one or more power supplies to transition from second power level to a third power level, wherein the third power level is greater than the first power level and less than the second power level;
operating the cellular module at the third power level to receive RF signals;
reducing, based at least in part on the transition to the third power level, power provided to at least one peripheral device; and
providing a second signal to the one or more power supplies to transition from the third power level to the first power level.
6. The method of claim 1, wherein the cellular module comprises first and second general-purpose input/output (GPIO) pins, and wherein the method additionally comprises:
signaling the one or more power supplies to transition from the first power level to the second power level, and signaling the one or more power supplies to transition from the second power level to the first power level, by operation of the first GPIO pin; and
signaling the one or more power supplies to transition to a third power level, responsive to a signal from the second GPIO pin.
7. The method of claim 1, wherein the method additionally comprises:
receiving input from a Coulomb counter;
determining a failure of an operational mode based at least in part on received input; and
sending a message from the cellular module, indicating the failure of the operational mode.
8. A metering device, comprising:
one or more power supplies, configured to provide power at a first power level and a second power level;
a metrology unit, powered by the one or more power supplies; and a cellular module, powered by the one or more power supplies, wherein the cellular module comprises:
  a radio, configured to transmit data when powered at the second power level;
  a processor, to control the radio;
  a memory in communication with the processor; and
  a general-purpose input/output (GPIO) pin, controlled by the processor, to signal the one or more power supplies to transition between the first power level and the second power level, wherein the second power level is higher than the first power level;
  wherein the cellular module performs actions comprising:
    receiving, at the processor and from the radio, an appointed time for a next communication;
    determining a time to activate the second power level of the one or more power supplies, to power the radio at the appointed time for the next communication; and
    sending a signal from the GPIO pin at the determined time.

9. The metering device as recited in claim 8, wherein the cellular module performs additional actions for determining the time to active the second power level of the one or more power supplies, comprising:
  by operating a timer, at least during a period of time wherein the one or more power supplies is at the first power level, and wherein the timer indicates the time to activate the second power level of the one or more power supplies.

10. The metering device as recited in claim 8, wherein the actions performed by the cellular module for determining the time to activate the first power level of the one or more power supplies are based at least in part on one or more of:
  temperature; or
  an age of a battery connected to the one or more power supplies.

11. The metering device as recited in claim 8, wherein the cellular module performs additional actions, comprising:
  sending a signal prior to conclusion of a communication that began at the appointed time, wherein the signal indicates need for a third power level that is lower than the second power level; and
  receiving the second power level in response to the signal.

12. The metering device as recited in claim 8, additionally comprising:
  a transmitter within the radio, wherein a first signal from the GPIO pin results in receipt of the first power level at the cellular module, which is sufficient for the cellular module to power the transmitter; and
  a receiver within the radio, wherein a second signal from the GPIO pin results in receipt of power at a second power level at the cellular module that is sufficient to power the receiver, and wherein the second power level is insufficient to power the transmitter.

13. A method of operating a cellular module, comprising:
  signaling one or more power supplies to transition between a first power level and a second power level, wherein the second power level is higher than the first power level, and wherein the signaling is performed by voltage on a general-purpose input/output (GPIO) pin of the cellular module;
  receiving, at a processor of the cellular module and from a radio of the cellular module, an appointed time for a next communication;
  determining a time to activate the second power level of the one or more power supplies, to power the radio to be ready for the next communication at the appointed time; and
  sending a signal from the GPIO pin at the determined time.

14. The method of claim 13, wherein, when operating using the first power level, the cellular module performs actions comprising:
  determining the time to activate the second power level of the one or more power supplies so that the second power level will be available in a just-in-time manner, to provide the cellular module with a power level required for reception and transmission.

15. The method of claim 13, additionally comprising:
  calculating a time-requirement for the one or more power supplies to transition from the first power level to the second power level, wherein the calculating is based at least in part on:
  an age of a battery powering the cellular module; or
  a fixed period of time.

16. The method of claim 13, additionally comprising:
  operating the cellular module using a third power level, wherein the third power level is greater than the first power level and less than the second power level, and wherein the third power level provides sufficient power to the cellular module to perform RF reception; and
  receiving time information, at the cellular module and from a remote cellular radio, while the cellular module operates using the third power level.

17. The method of claim 13, additionally comprising:
  providing a first signal to the one or more power supplies to transition from second power level to a third power level, wherein the third power level is greater than the first power level and less than the second power level;
  operating the cellular module at the third power level to receive RF signals;
  reducing, based at least in part on the transition to the third power level, power provided to at least one peripheral device; and
  providing a second signal to the one or more power supplies to transition from the third power level to the first power level.

18. The method of claim 13, wherein the GPIO pin is a first GPIO pin, wherein the cellular module comprises the first GPIO pin and a second GPIO pin, and wherein the method additionally comprises:
  signaling the one or more power supplies to transition from the first power level to the second power level, and signaling the one or more power supplies to transition from the second power level to the first power level, by operation of the first GPIO pin; and
  signaling the one or more power supplies to transition to a third power level, responsive to a signal from the second GPIO pin.

19. The method of claim 13, wherein the method additionally comprises:
  receiving input from a Coulomb counter;
  determining a failure of an operational mode based at least in part on received input; and
  sending a message from the cellular module, indicating the failure of the operational mode.

* * * * *